(12) United States Patent
Hsieh

(10) Patent No.: US 7,526,186 B2
(45) Date of Patent: Apr. 28, 2009

(54) METHOD OF SCALING SUBPICTURE DATA AND RELATED APPARATUS

(75) Inventor: Yu-Ching Hsieh, Taipei (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 745 days.

(21) Appl. No.: 10/907,737

(22) Filed: Apr. 13, 2005

(65) Prior Publication Data

US 2006/0233518 A1    Oct. 19, 2006

(51) Int. Cl.
*H04N 5/00* (2006.01)
*H04N 5/91* (2006.01)
*H04N 5/445* (2006.01)
*H04N 9/76* (2006.01)
*G06K 9/36* (2006.01)

(52) U.S. Cl. .................... 386/95; 386/82; 386/125; 386/126; 348/564; 348/566; 348/567; 348/599; 382/233; 382/236

(58) Field of Classification Search .................. 386/95, 386/82, 125, 126, E9.04; 348/564, 566, 567; 348/599, E9.009; 375/E7.102, E7.105; 382/233, 382/236
See application file for complete search history.

(56) References Cited

U.S. PATENT DOCUMENTS

| 5,831,684 A |   | 11/1998 | Morita |         |
|-------------|---|---------|--------|---------|
| 5,835,636 A | * | 11/1998 | Auld   | 382/233 |
| 6,219,455 B1 | * | 4/2001 | Ogura | 382/236 |
| 6,249,640 B1 | * | 6/2001 | Takiguchi et al. | 386/82 |
| 6,323,868 B1 |   | 11/2001 | Paluch, Jr. | |
| 6,359,653 B1 |   | 3/2002 | Huang | |
| 6,678,006 B1 | * | 1/2004 | Velez et al. | 348/564 |

FOREIGN PATENT DOCUMENTS

| EP | 0746154 B1 | 9/2000 |
| JP | 2002335496 A | 11/2002 |
| JP | 2002335497 A | 11/2002 |

* cited by examiner

*Primary Examiner*—Thai Tran
*Assistant Examiner*—Syed Y Hasan
(74) *Attorney, Agent, or Firm*—Winston Hsu (57) ABSTRACT

A method for scaling subpicture data comprises receiving a video data stream and a subpicture data stream; pre-parsing the subpicture data stream to obtain line information of subpicture data, the subpicture data containing both top field pixel data and bottom field pixel data; calculating the number of lines contained in the top field pixel data and the bottom field pixel data from the pre-parsed line information; interlacing the top field pixel data and the bottom field pixel data; scaling the top and bottom field pixel data together in interlaced form for adjusting the number of lines contained in the top field pixel data and the bottom field pixel data; separating the scaled pixel data into updated top field pixel data and updated bottom field pixel data; and separately storing the updated top field pixel data and the updated bottom field pixel data in a memory.

14 Claims, 7 Drawing Sheets

Fig. 7 ure 8 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15 and 15

METHOD OF SCALING SUBPICTURE DATA AND RELATED APPARATUS

BACKGROUND

The invention relates to digital video processing, and more particularly, to a method and apparatus for scaling DVD subpicture data.

Displaying typical television/video source data on displays with different resolutions is well known. For example, video signals such as television broadcasts signals, cable television signals, satellite television signals, VCR signals, and DVD (which initials have been attributed to represent "digital versatile disc" and "digital video disc") signals can be displayed on computer displays or televisions. Television also has different standards such as the National Television System Committee (NTSC) and the Phase Alternation Line (PAL) standards. The NTSC standard has a resolution of 720 pixels by 480 pixels whereas the PAL standard has a vertical resolution of 720 pixels by 576 pixels. Therefore, when converting between the NTSC and PAL display standards, or from one of these standards to a computer display standard, the television video signals must be scaled.

There are a variety of ways in which video data may be scaled. For example, when video data is to be upscaled (i.e., the target display is larger than the source display), pixel information may be repeated in several pixel locations to fill in the extra pixels of the upscaled display. Alternatively, pixel information may be blended within an area to fill in additional pixel locations that result from upscaling. For downscaling, the pixel information at a given pixel location is a result of merging pixel information of surrounding pixel locations of the source display. The merging may be a blending, averaging, selecting one of the pixel as a representative pixel, or combination thereof.

When video data is scaled, subpicture data needs to be scaled as well. Due to a small number of lines usually allocated to displaying subpicture data, it is important that the subpicture data be scaled properly.

Figure 1:
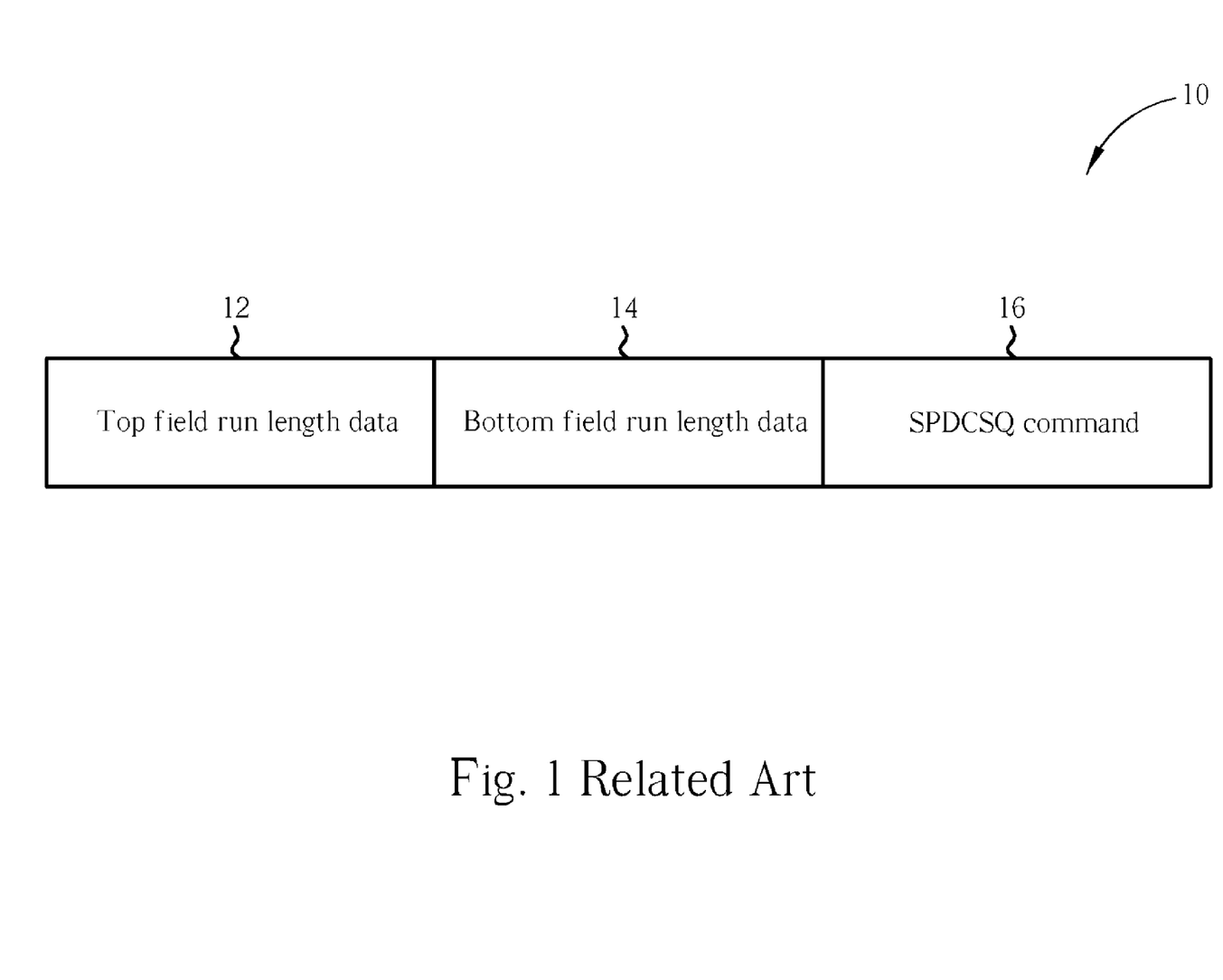
FIG. 1 illustrates a subpicture unit containing subpicture data.

Please refer to FIG. 1. FIG. 1 illustrates a subpicture unit 10 containing subpicture data. The subpicture unit 10 includes top field run-length data 12, bottom field run-length data 14, and SubPicture Display Control SeQuence (SPDCSQ) command data 16. Among other things, the SPDCSQ command data 16 indicates starting and stopping locations of subpicture data stored in the top and bottom run-length data 12 and 14, and indicates the starting and stopping time of the subpicture data to be displayed.

Figure 2:
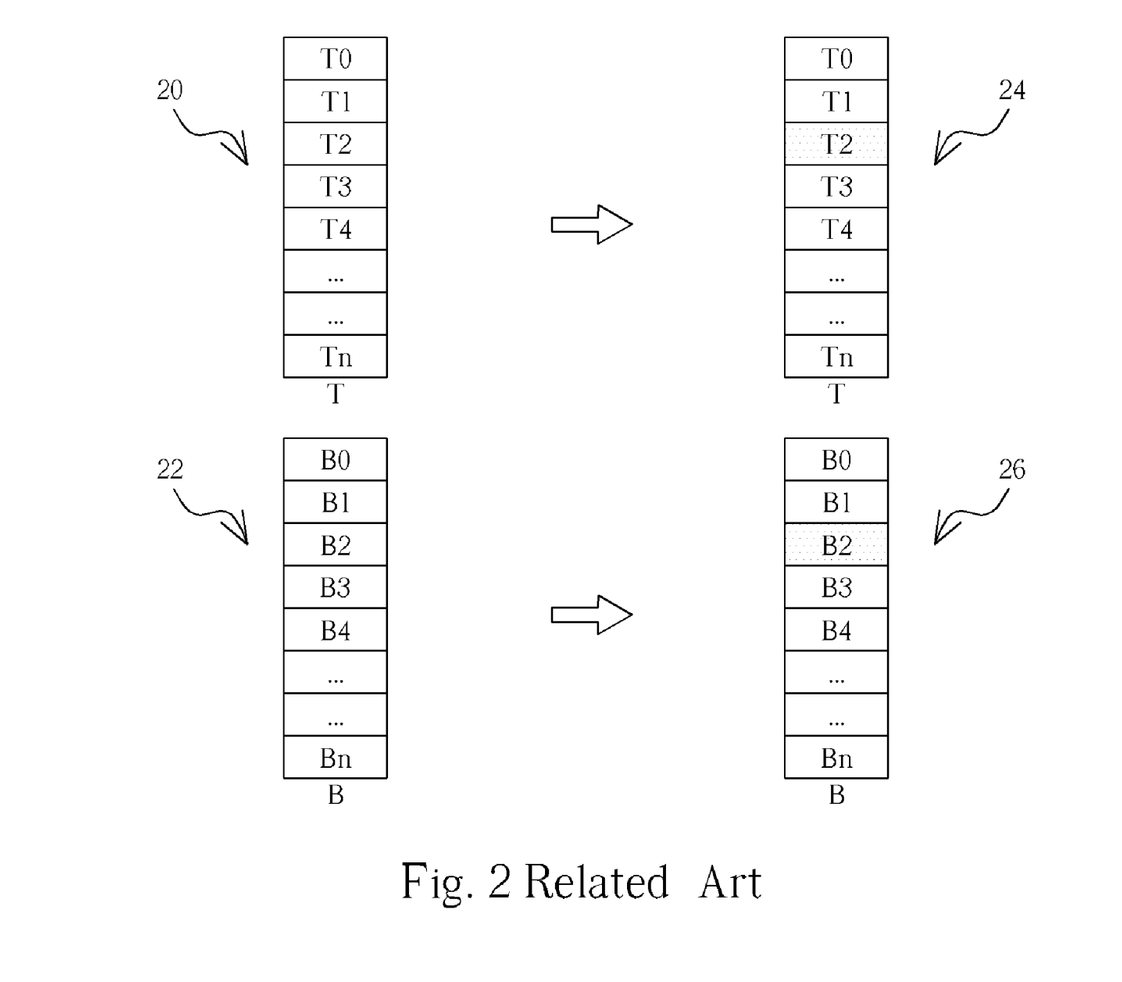
FIG. 2 illustrates a conventional subpicture scaling process.

Please refer to FIG. 2. FIG. 2 illustrates a conventional subpicture scaling process. Non-scaled top and bottom subpicture data 20 and 22 is transformed into scaled top and bottom subpicture data 24 and 26 through a downscaling operation. As an illustrative example, FIG. 2 shows a downscaling operation in which one line is removed for every three lines of subpicture data. That is, every third line present in each of the non-scaled top subpicture data 20 and the non-scaled bottom subpicture data 22 is removed to create the scaled top and bottom subpicture data 24 and 26. In FIG. 2, the first five lines of the non-scaled top subpicture data 20 are labeled as T0, T1, T2, T3, and T4, and the first five lines of the non-scaled bottom subpicture data 22 are labeled as B0, B1, B2, B3, and B4. Since every third line is dropped from each of the top and bottom subpicture data, the lines T2 and B2 are shaded for indicating that these lines are removed from the scaled top and bottom subpicture data 24 and 26, respectively.

Figure 3:
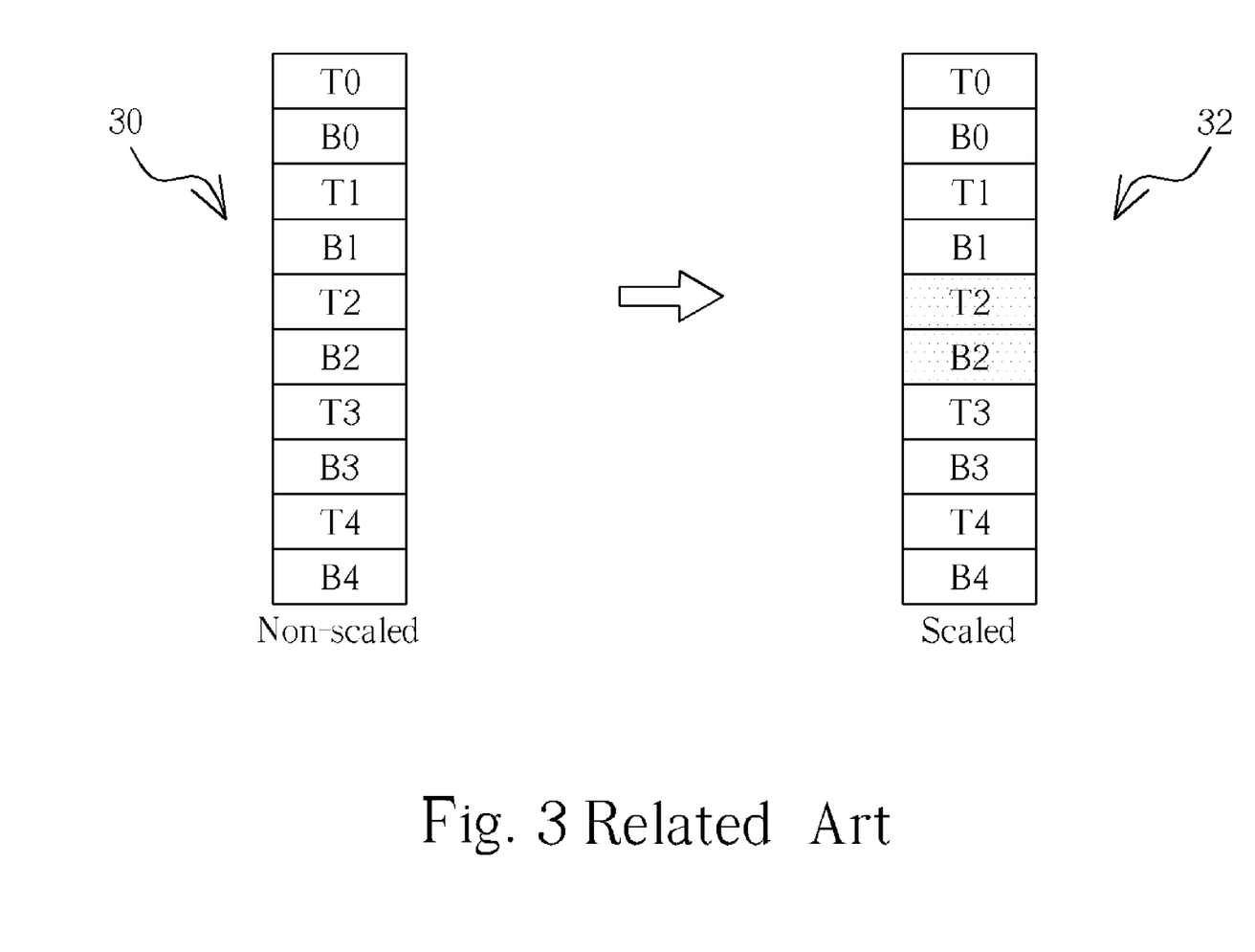
FIG. 3 illustrates the effects of subpicture scaling when displaying subpicture data in interlaced form.

Please refer to FIG. 3. FIG. 3 illustrates the effects of subpicture scaling when displaying subpicture data in interlaced form. If the non-scaled top and bottom subpicture data 20 and 22 were to be interlaced and displayed in non-scaled form, the result would be the interlaced non-scaled subpicture data 30 shown in FIG. 3. However, if the scaled top and bottom subpicture data 24 and 26 were displayed in interlaced form, the result would be the interlaced scaled subpicture data 32. As is apparent in FIG. 3, since the scaling operation is performed on the non-scaled top subpicture data 20 and the non-scaled bottom subpicture data 22 separately, two adjacent lines of the interlaced non-scaled subpicture data 30 are removed. Because the interlaced scaled subpicture data 32 contains adjacent lines that are removed, the quality of the subpicture data may be severely degraded. For instance, if the letter "A" is to be displayed in the subpicture data, and two adjacent lines are removed, the effect could be the removal of the horizontal bar "-" in the letter "A". In this case, the scaled version of the letter "A" would look something like a carrot top "^".

In short, the conventional method for scaling subpicture data by scaling the top data and the bottom data separately has a negative effect on the quality of the subpicture. In addition to the problem noted above, use of the conventional scaling method may cause the subpicture to flicker and to become difficult to read.

SUMMARY

Methods and apparatuses for scaling subpicture data are provided. An exemplary embodiment of a method for scaling subpicture data comprises: receiving a video data stream and a subpicture data stream; pre-parsing the subpicture data stream to obtain line information of subpicture data, the subpicture data containing both top field pixel data and bottom field pixel data; calculating the number of lines contained in the top field pixel data and the bottom field pixel data from the pre-parsed line information; interlacing the top field pixel data and the bottom field pixel data; scaling the top and bottom field pixel data together in interlaced form for adjusting the number of lines contained in the top field pixel data and the bottom field pixel data; separating the scaled pixel data into updated top field pixel data and updated bottom field pixel data; and separately storing the updated top field pixel data and the updated bottom field pixel data in a memory.

An exemplary embodiment of a video processing circuit comprises: an input for receiving a video data stream and a subpicture data stream; a decoding module for pre-parsing the subpicture data stream to obtain line information of subpicture data, the subpicture data containing both top field pixel data and bottom field pixel data; a subpicture scaling module for calculating the number of lines contained in the top field pixel data and the bottom field pixel data from the pre-parsed line information, interlacing the top field pixel data and the bottom field pixel data, scaling the top and bottom field pixel data together in interlaced form for adjusting the number of lines contained in the top field pixel data and the bottom field pixel data, and separating the scaled pixel data into updated top field pixel data and updated bottom field pixel data; and a memory for separately storing the updated top field pixel data and the updated bottom field pixel data in a memory.

An exemplary embodiment of a DVD system is also disclosed, which comprises: interface logic for receiving audio, video, and subpicture data streams; audio/video (AV) decoding circuitry for decoding the received audio and video data streams; and subpicture decoding circuitry for decoding the received subpicture data stream. The subpicture decoding circuitry comprises: a decoding module for pre-parsing the subpicture data stream to obtain line information of subpicture data, the subpicture data containing both top field pixel data and bottom field pixel data; a subpicture scaling module for calculating the number of lines contained in the top field pixel data and the bottom field pixel data from the pre-parsed line information, interlacing the top field pixel data and the bottom field pixel data, scaling the top and bottom field pixel data together in interlaced form for adjusting the number of lines contained in the top field pixel data and the bottom field pixel data, and separating the scaled pixel data into updated top field pixel data and updated bottom field pixel data; and a memory for separately storing the updated top field pixel data and the updated bottom field pixel data in a memory.

DETAILED DESCRIPTION

In the example of DVD systems, a subpicture unit represents a subpicture image to be displayed on the screen, which comprises a subpicture unit header, pixel data, and a display command sequence table (DCSQT). The subpicture unit header provides information about the size of a subpicture unit and the start address of the DCSQT. The pixel data is further divided into two fields, a top field and a bottom field. The top and bottom field pixel data both contain a plurality of 2-bit values specifying how pixels of a subpicture image are to appear. For example, a pixel may be defined as a background pixel by "00", as a pattern pixel by "01", as the first emphasis pixel by "10", and as the second emphasis pixel by "11". Prior to storage or transmission, pixel data is generally compressed using a lossless compression algorithm such as the run-length encoding. The DCSQT provides timing and control information for a subpicture image, and contains a list of display control sequences each comprising a display control start time, the address of the next display control sequence, and a series of display control commands. The display control commands include timing, color, contrast, and other display characteristics; they operate to specify how each type of pixel of a subpicture image is to be displayed.

Figure 4:
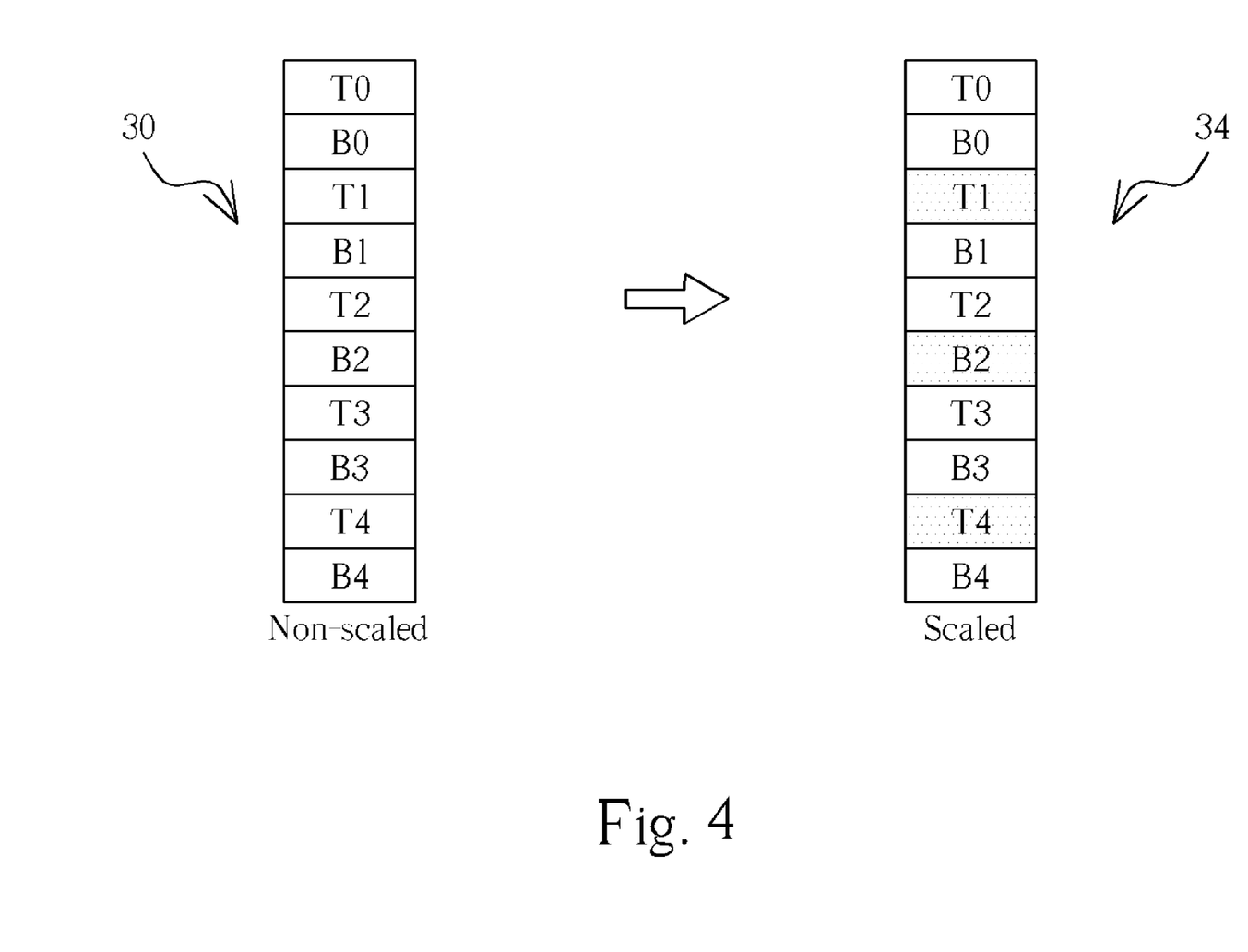
FIG. 4 illustrates a method of scaling subpicture data by combining top and bottom field data before performing the scaling operation.

Please refer to FIG. 4. FIG. 4 illustrates a method of scaling subpicture data by combining top and bottom field data before performing the scaling operation. As was discussed with respect to FIG. 2 and FIG. 3, non-scaled top and bottom subpicture data 20 and 22 are interlaced together to form interlaced non-scaled subpicture data 30. For consistency with the scaling example given in the background section above, suppose that a downscaling operation is again performed in which one line is removed for every three lines of subpicture data. That is, every third line present in the interlaced non-scaled subpicture data 30 is dropped during the scaling operation. The result of this scaling operation can be seen in the interlaced scaled subpicture data 34 shown in FIG. 4. Thus, by scaling the top and bottom field data together in interlaced form instead of scaling the top and bottom field data separately, the lines dropped through the scaling process are separated from each other, leading to a higher quality scaled subpicture.

Figure 5:
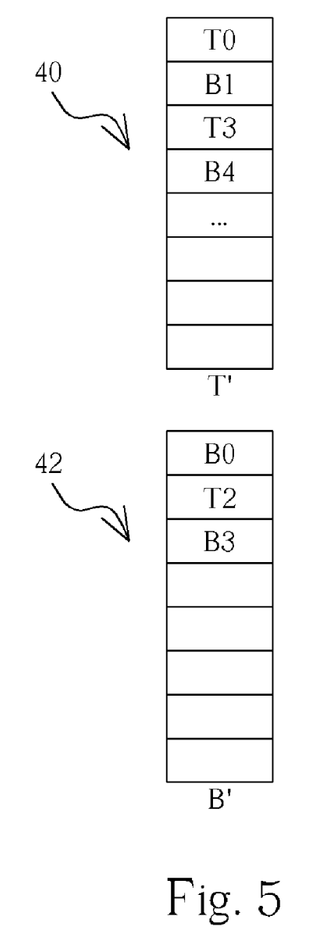
FIG. 5 illustrates separating interlaced scaled subpicture data into updated top field data and updated bottom field data as shown in FIG. 5.

Of course the above illustration in which one out of three lines is dropped is used as an example only, and other scaling operations can be performed, including upscaling operations. Regardless of the kind of scaling performed, the top and the bottom field data are first interlaced to form the interlaced non-scaled subpicture data 30. Then the scaling operation is performed to form the interlaced scaled subpicture data 34. Finally, the interlaced scaled subpicture data 34 is separated again into updated top field data 40 and updated bottom field data 42 as shown in FIG. 5. The updated top field data 40 is created by selecting every odd line remaining in the interlaced scaled subpicture data 34, whereas the updated bottom field data 42 is created by selecting every even line remaining in the interlaced scaled subpicture data 34.

Figure 6:
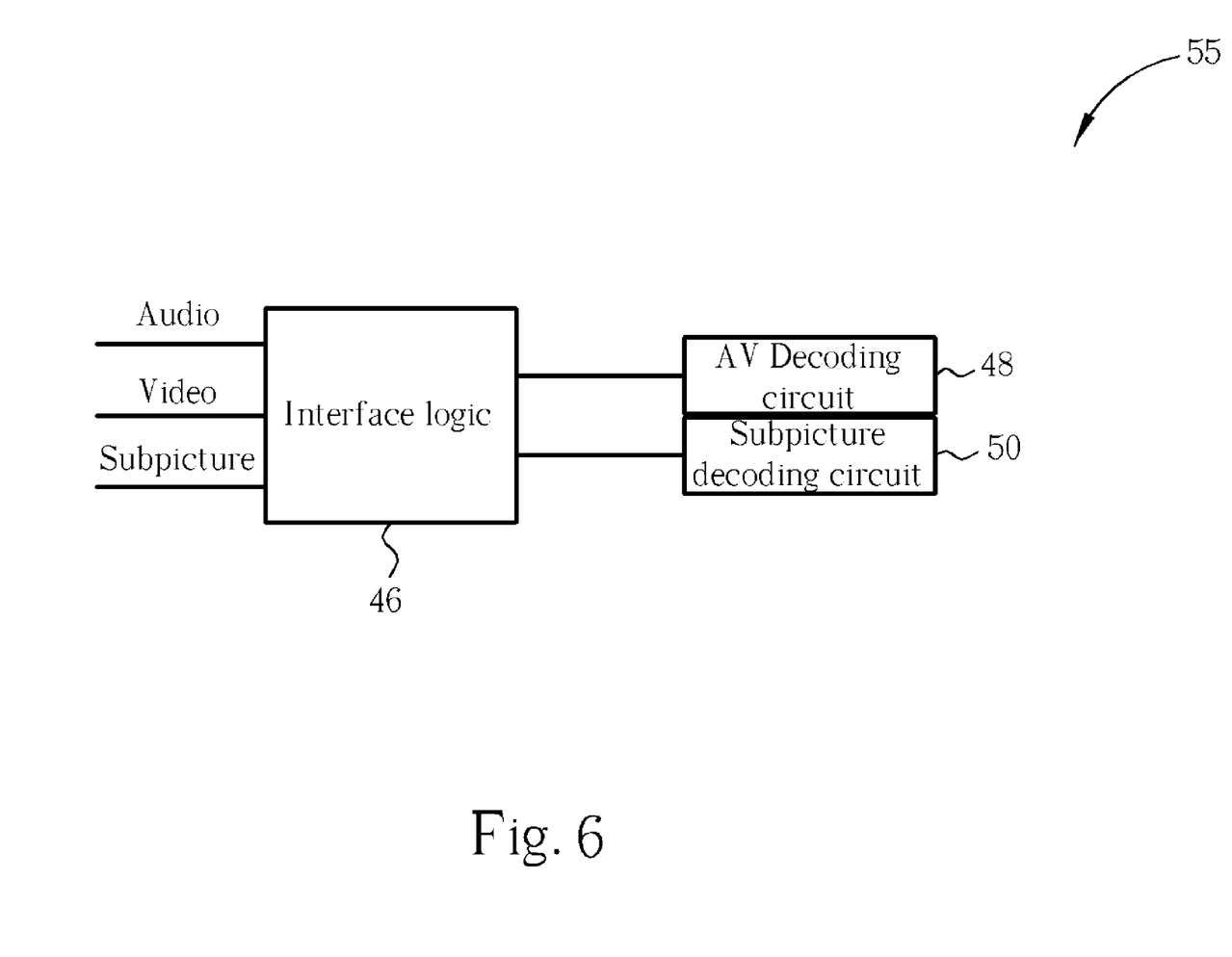
FIG. 6 is a functional block diagram of an exemplary embodiment of a DVD system.

Please refer to FIG. 6. FIG. 6 is a functional block diagram of an exemplary embodiment of a DVD system 55. The DVD system 55 comprises interface logic 46 for receiving audio, video, and subpicture data streams. An audio/video (AV) decoding circuit 48 is connected to the interface logic 46 for decoding the received audio and video data streams. Similarly, a subpicture decoding circuit 50 is connected to the interface logic 46 for decoding the received subpicture data stream. The subpicture decoding circuit 50 will be explained in greater detail below.

Figure 7:
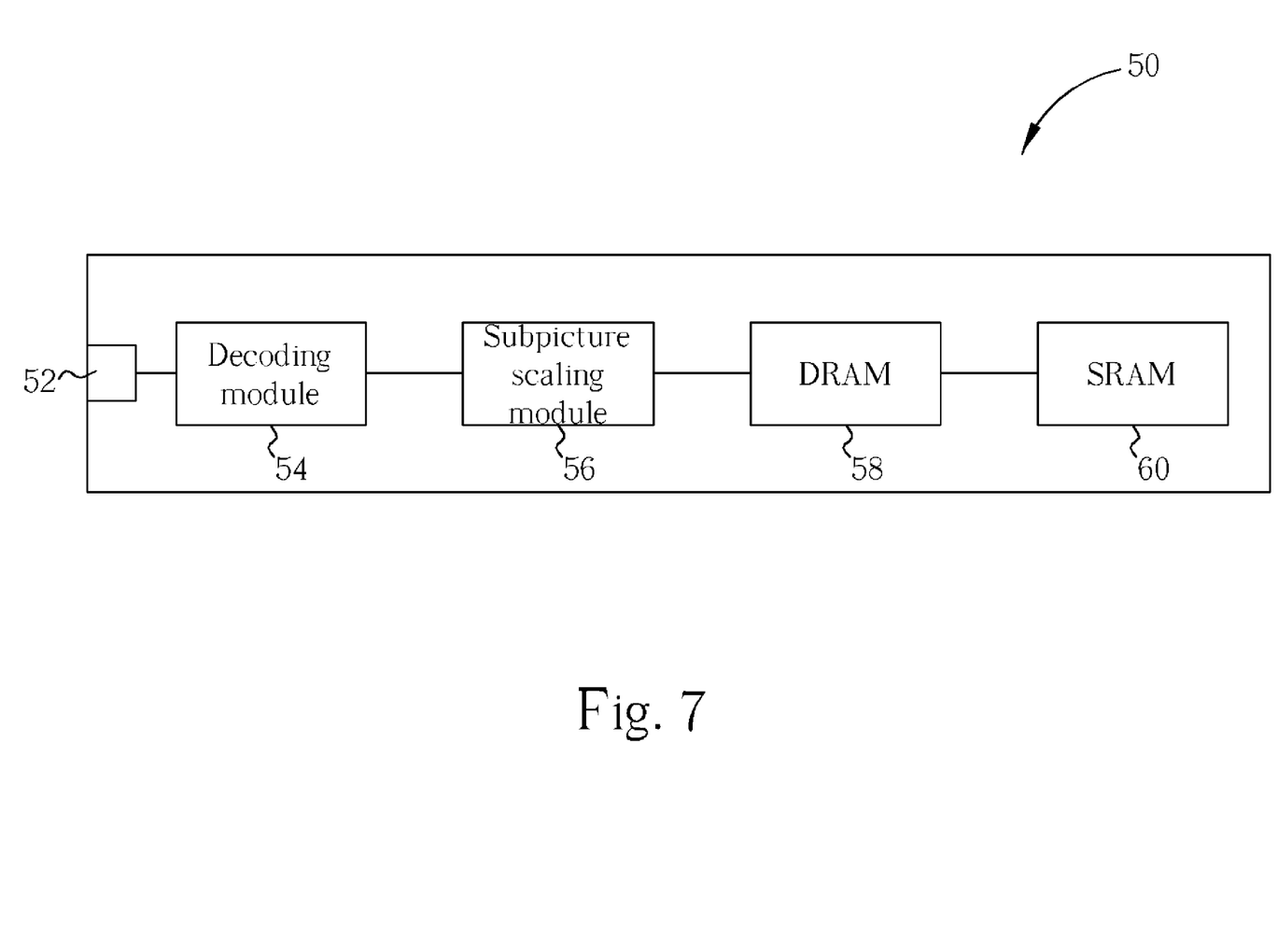
FIG. 7 is a functional block diagram of an exemplary embodiment of a subpicture decoding circuit.

Please refer to FIG. 7. FIG. 7 is a functional block diagram of an exemplary embodiment of a subpicture decoding circuit 50. The subpicture decoding circuit 50 comprises an input 52 for receiving the subpicture data stream from the interface logic 46. The subpicture decoding circuit 50 also contains a decoding module 54 for acquiring line information of subpicture data by decoding only necessary pixel data and DCSQT present in each subpicture unit of the subpicture data stream received. As such, the decoding module 54 pre-parses the top and bottom field run-length data 12 and 14 and the SPDCSQ command data 16 in order to determine the effective number of lines contained in the subpicture data, as well as the offset address of each line in the top and bottom field pixel data. Based on these results, a subpicture scaling module 56 interlaces the top field data and the bottom field data together while the field data is in encoded form, calculates the total number of lines in the interlaced field data, and scales the interlaced field data according to the scaling operation to be performed. After scaling the interlaced field data, the subpicture scaling module 56 then separates interlaced field data into updated top field data and updated bottom field data, as is shown in FIG. 5. That is, every odd line of the scaled interlaced field data is selected to be in the updated top field data and every even line of the scaled interlaced field data is selected to be in the updated bottom field data. The updated top field data and the updated bottom field data is then written into a DRAM 58, where the field data is still in encoded form.

After the updated top and bottom field data are stored in the DRAM 58, the top and bottom field data are decoded and stored in a second memory, such as an SRAM 60. This step, along with subsequent steps of displaying the video data and subpicture data is well known to those skilled in the art.

The method of scaling subpicture data described above can be used for scaling a DVD subpicture data stream when scaling DVD video. However, the scaling method is not limited to this. The method is also suitable for scaling any type digital video that also contains subpicture data, and the resulting scaled subpicture data will have higher quality compared to that of conventional subpicture scaling methods.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of scaling subpicture data, the method comprising:
   receiving a video data stream and a subpicture data stream;
   pre-parsing the subpicture data stream to obtain line information of subpicture data, the subpicture data containing both top field pixel data and bottom field pixel data;
   calculating the number of lines contained in the top field pixel data and the bottom field pixel data from the pre-parsed line information;
   interlacing the top field pixel data and the bottom field pixel data;
   scaling the top and bottom field pixel data together in interlaced form for adjusting the number of lines contained in the top field pixel data and the bottom field pixel data;
   separating the scaled pixel data into updated top field pixel data and updated bottom field pixel data; and
   separately storing the updated top field pixel data and the updated bottom field pixel data in a memory.

2. The method of claim 1, wherein pre-parsing the subpicture data stream to obtain subpicture data line information comprises decoding SubPicture Display Control SeQuence (SPDCSQ) command data contained in the subpicture data.

3. The method of claim 1, wherein the top field pixel data and the bottom field pixel data are scaled in encoded form.

4. The method of claim 1, wherein separating the scaled pixel data into updated top field pixel data and updated bottom field pixel data comprises selecting every odd line of the scaled pixel data to be the updated top field pixel data and selecting every even line of the scaled pixel data to be the updated bottom field pixel data.

5. The method of claim 1, wherein the video data stream is a digital versatile disc (DVD) data stream and the subpicture data stream is a DVD subpicture data stream.

6. A video processing circuit, comprising:
   an input for receiving a video data stream and a subpicture data stream;
   a decoding module for pre-parsing the subpicture data stream to obtain line information of subpicture data, the subpicture data containing both top field pixel data and bottom field pixel data;
   a subpicture scaling module for calculating the number of lines contained in the top field pixel data and the bottom field pixel data from the pre-parsed line information, interlacing the top field pixel data and the bottom field pixel data, scaling the top and bottom field pixel data together in interlaced form for adjusting the number of lines contained in the top field pixel data and the bottom field pixel data, and separating the scaled pixel data into updated top field pixel data and updated bottom field pixel data; and
   a memory for separately storing the updated top field pixel data and the updated bottom field pixel data in a memory.

7. The video processing circuit of claim 6, wherein the decoding module decodes SubPicture Display Control SeQuence (SPDCSQ) command data contained in the subpicture data to obtain the subpicture data line information.

8. The video processing circuit of claim 6, wherein the subpicture scaling module scales the top field pixel data and the bottom field pixel data in encoded form.

9. The video processing circuit of claim 6, wherein the subpicture scaling module selects every odd line of the scaled pixel data to be the updated top field pixel data and selects every even line of the scaled pixel data to be the updated bottom field pixel data.

10. The video processing circuit of claim 6, wherein the video data stream is a digital versatile disc (DVD) data stream and the subpicture data stream is a DVD subpicture data stream.

11. A digital versatile disc (DVD) system comprising:
    interface logic for receiving audio, video, and subpicture data streams;
    audio/video (AV) decoding circuitry for decoding the received audio and video data streams; and
    subpicture decoding circuitry for decoding the received subpicture data stream, the subpicture decoding circuitry comprising:
      a decoding module for pre-parsing the subpicture data stream to obtain line information of subpicture data, the subpicture data containing both top field pixel data and bottom field pixel data;
      a subpicture scaling module for calculating the number of lines contained in the top field pixel data and the bottom field pixel data from the pre-parsed line information, interlacing the top field pixel data and the bottom field pixel data, scaling the top and bottom field pixel data together in interlaced form for adjusting the number of lines contained in the top field pixel data and the bottom field pixel data, and separating the scaled pixel data into updated top field pixel data and updated bottom field pixel data; and
      a memory for separately storing the updated top field pixel data and the updated bottom field pixel data in a memory.

12. The system of claim 11, wherein the decoding module decodes SubPicture Display Control SeQuence (SPDCSQ) command data contained in the subpicture data to obtain the subpicture data line information.

13. The system of claim 11, wherein the subpicture scaling module scales the top field pixel data and the bottom field pixel data in encoded form.

14. The system of claim 11, wherein the subpicture scaling module selects every odd line of the scaled pixel data to be the updated top field pixel data and selects every even line of the scaled pixel data to be the updated bottom field pixel data.

* * * * *